UNITED STATES PATENT OFFICE.

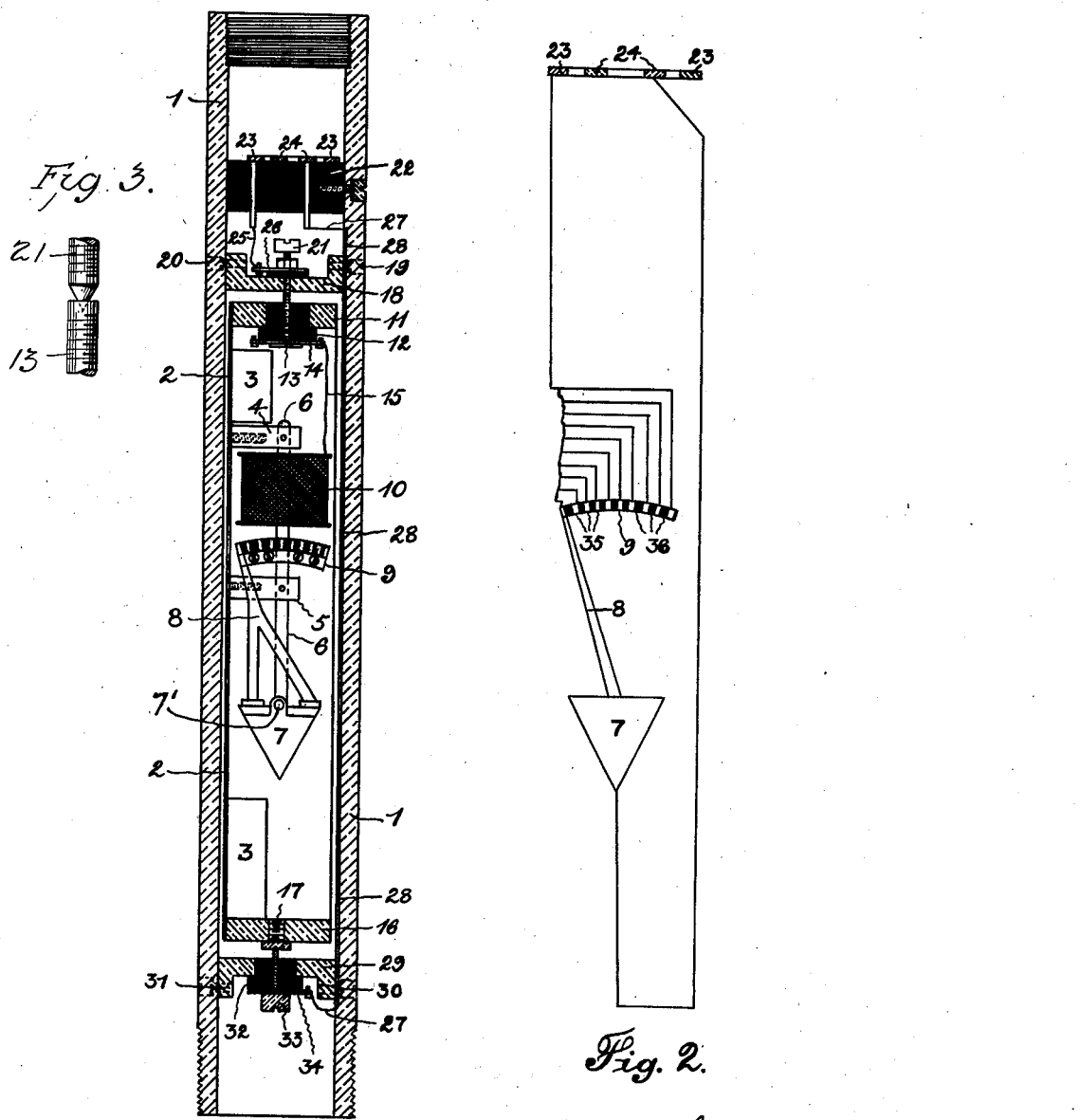

HUGH FREDERICK MARRIOTT, OF PARKTOWN, TRANSVAAL.

MEANS FOR SURVEYING BORE-HOLES.

No. 840,148. Specification of Letters Patent. Patented Jan. 1, 1907.

Original application filed August 30, 1904, Serial No. 222,776. Divided and this application filed February 21, 1905. Serial No. 246,751.

*To all whom it may concern:*

Be it known that I, HUGH FREDERICK MARRIOTT, a subject of the King of Great Britain, residing at Parktown, near Johannesburg, Transvaal, have invented certain new and useful Improvements in Means for Surveying Bore-Holes, of which the following is a specification.

The improvements constituting the subject-matter of the present application have reference to means or devices for surveying bore-holes, and more especially to an instrument or device for determining the amount of dip.

In a prior application for patent filed by me on the 30th of August, 1904, under Serial No. 222,776, I describe an instrument designed for the purpose above specified in which electricity is employed and by means of which a complete and continuous reading is obtained as the instrument is lowered down the bore-hole, which reading may be verified as the instrument is withdrawn from the bore-hole.

The present invention, which is a division of the above-mentioned application, has particular reference to an instrument of this kind, and it relates especially to the means for transmitting the movements of the switch-arm over the commutator.

In the arrangement described and illustrated in my prior application, Serial No. 222,776, the electrical connections are such that the switch-arm first makes a free current, then a blank, then a resistance, then a blank, then a free current, then a blank, then a resistance, and so on.

According to the present invention the electrical connections are so arranged that the switch-arm starts from a normal position with a maximum resistance and gradually as the switch-arm moves over the commutator cuts out the resistance, each segment of the resistance being interspaced with a blank.

In order that the application of my present improvement may be more readily understood, I append an explanatory sheet of drawings, which is marked with characters of reference corresponding to the following description.

In the drawings, Figure 1 represents a vertical sectional elevation of that portion of the instrument to which my present improvements are applied, and Fig. 2 is a diagrammatical representation of the electrical connections embodying the improvements. Fig. 3 is a detail.

The instrument is illustrated in Fig. 1 constructed in accordance with my prior application, Serial No. 222,776—that is to say, it consists of a tube 1, which serves to inclose the several operative parts of the instrument. Inside this tube is pivotally supported a hemicylinder 2. 3 represents the weights fixed to the hemicylinder 2, which operate in conjunction with the other parts of the instrument to cause said hemicylinder 2 to come to rest in such a position when the instrument is inclined that the switch-arm moves in a vertical plane. 4 5 are the brackets fixed inside the hemicylinder 2, which support the vertical rod 6. 7 is the plumb-bob pivoted at 7' to the lower end of the rod 6, and 8 the switch-arm fixed to the plumb-bob. 9 is the commutator fixed to the rod 6 in such a position that the upper end of the switch-arm 8 moves over it, and 10 is the resistance-coil which is connected up with the commutator in the manner hereinafter more particularly described. 11 is the disk fitted in the upper end of the hemicylinder 2, which carries the insulating bush or block 12, carrying the screw 13 and disk 14, which latter is connected by the wire 15 to the coil 10, and 16 is the disk fitted in the other end of the hemicylinder 2, which carries the screw 17. 18 is the disk fixed inside the tube 1 above the disk 11 by means of the screws 19 20, and 21 is the screw which serves as the top pivot about which the hemicylinder 2 moves. 22 is an ebonite block or disk carrying the contact-rings 23 24, and 25 is the wire connecting the outer contact-ring 23 with the metal disk or plate 26 on the pivot-screw 21. 27 is the other wire from the other contact-ring 24, which is located in the groove 28 inside the tube 1, down which it passes to the bottom of the hemicylinder 2. 29 is the disk fixed inside the tube 1 below the hemicylinder 2 by means of the screws 30 31, and 32 is the bush or block of ebonite in which is fitted the screw 33, which forms the pivot about which the lower end of the hemicylinder 2 revolves, and 34 the metal plate or disk to which the wire 27 is attached.

Referring now to Fig. 2, the commutator 9 consists of a number of segments of platinum or other suitable metal 35, alternating with pieces of ebonite or other non-conducting material 36. When the switch-arm 8 is in its normal position, (the position in which it is shown in both views of the drawings,) it will be noted that the circuit is completed through the complete coil 10 and that with each successive metal contact 35 the resistance is gradually cut out as the switch-arm 8 travels over the commutator 9. The ebonite or other non-conducting segments 36 between the metal contacts 35 provide a break or blank alternately with each segment of the resistance.

What I claim as my invention, and desire to protect by Letters Patent, is—

1. An instrument for surveying bore-holes comprising a casing, a revoluble portion mounted therein, a plumb-bob pivotally carried by said revoluble portion, a switch-arm carried by said plumb-bob, a commutator carried by the revoluble portion over which the switch-arm is caused to travel as the revoluble portion is inclined, and a resistance-coil, the resistance-coil and commutator being so arranged that the switch-arm starts from a normal position with a maximum resistance and as it passes over the commutator gradually varies the resistance, substantially as described.

2. An instrument for surveying bore-holes comprising in combination a casing, a portion pivoted therein, said portion being weighted upon one side, a plumb-bob carried by said pivoted portion, a switch-arm carried by said plumb-bob, a commutator and a resistance-coil carried by said pivoted portion, said commutator consisting of a number of metal contacts interspaced with non-conducting material, the commutator and coil being so connected that the switch-arm starts from a normal position with a maximum resistance and gradually as it passes over the commutator cuts out the resistance and provides a blank between each segment of the resistance, substantially as described.

3. In an instrument for surveying bore-holes in combination, an outer casing, a portion pivoted therein, said portion being weighted upon one side, a plumb-bob carried by said pivoted portion, a switch-arm carried by said plumb-bob a commutator and a resistance-coil carried by said pivoted portion and arranged so that the declination of the plumb-bob from the vertical causes the switch-arm to move over the commutator, the commutator and coil being arranged so that the switch-arm starts from a normal position with a maximum resistance and gradually as it passes over the commutator cuts out the resistance, each successive metal contact being interspaced with insulating material which forms a blank or break in the circuit, substantially as described.

In witness whereof I have hereunto set my hand in the presence of two subscribing witnesses.

HUGH FREDERICK MARRIOTT.

Witnesses:
CHAS. OVENDALE,
R. OVENDALE.